F. C. KUMMEROW.
VEHICLE WHEEL.
APPLICATION FILED SEPT. 18, 1916.
1,245,357.
Patented Nov. 6, 1917.
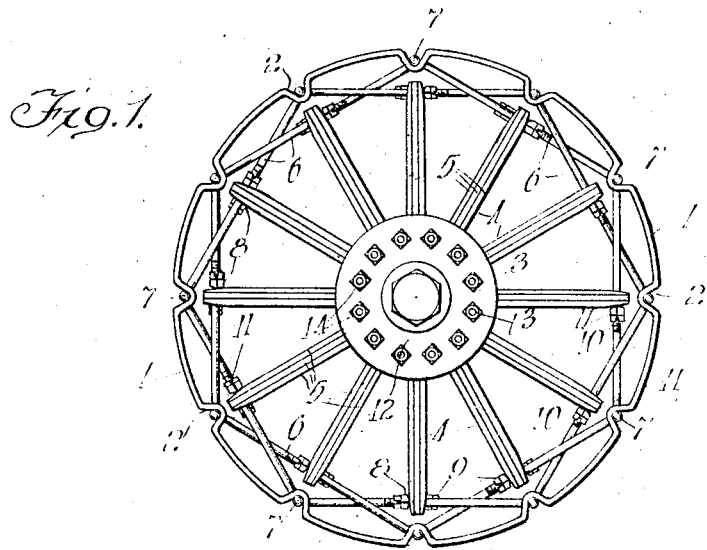
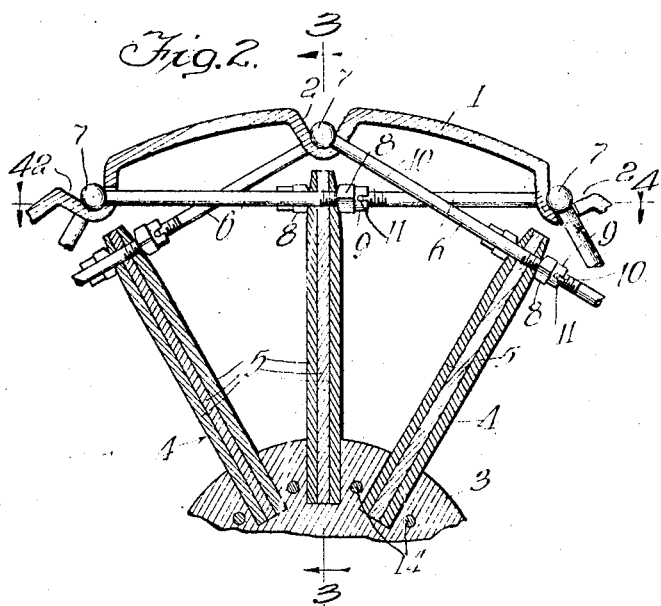
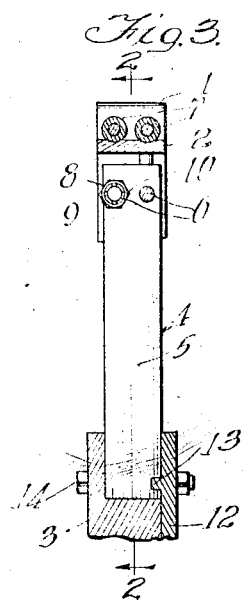
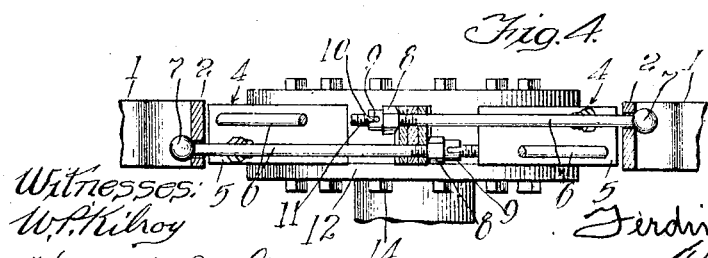
Witnesses:
W. P. Kilroy
Harry R. C. White
Inventor:
Ferdinand C. Kummerow
By Rudolph ... Attys

UNITED STATES PATENT OFFICE.

FERDINAND C. KUMMEROW, OF CHICAGO, ILLINOIS.

VEHICLE-WHEEL.

1,245,357.  Specification of Letters Patent.  Patented Nov. 6, 1917.

Application filed September 18, 1916. Serial No. 120,835.

*To all whom it may concern:*

Be it known that I, FERDINAND C. KUMMEROW, citizen of the United States, residing at Chicago, in the county of Cook and State of Illinois, have invented certain new and useful Improvements in Vehicle-Wheels; and I do hereby declare the following to be a full, clear, and exact description of the invention, such as will enable others skilled in the art to which it appertains to make and use the same.

This invention relates to improvements in vehicle wheels and has for its general object to provide a vehicle wheel in which the hub is capable of movement relatively to the felly in the plane of the latter to an extent determined by the flexibility of the elements interposed between and engaged with the hub and felly respectively.

The particular objects of the invention are:

First: To provide a vehicle wheel in which the hub is suspended from the felly by a plurality of elements so arranged as to distribute the load over a large number of points in the felly, and over a large number of flexible suspension elements.

Second: To provide a vehicle-wheel in which the greater number of the flexible elements suspending the hub from the felly or supporting the hub within the felly are simultaneously flexed in two directions under the influence of load and in which the remaining flexible elements are flexed in one direction, whereby the load is distributed simultaneously over all of the said flexible elements.

Third: To provide a vehicle-wheel adapted to attain the foregoing objects which is further adapted to resist distortion by lateral strains imposed by so-called "side-swiping" of road obstructions such as car-rails and the like, and such as result from travel on roads having lateral incline.

Fourth: To provide a vehicle wheel of the character set forth which may be easily and quickly repaired and which is noiseless in travel.

The invention consists in the features of construction and combinations of parts hereinafter fully described and claimed.

In the accompanying drawings illustrating a suitable embodiment of the invention:

Figure 1 is a view in side elevation of a vehicle wheel constructed in accordance with my invention.

Fig. 2 is a fragmentary detail section of same on the line 2—2 of Fig. 3.

Fig. 3 is a fragmentary detail section of same on the line 3—3 of Fig. 2.

Fig. 4 is a fragmentary detail section of the same on the line 4—4 of Fig. 2.

The said wheel comprises the felly 1 comprising a flat metal hoop which is provided at intervals with inwardly extending concavo-convex portions constituting U-shaped projections 2. Disposed centrally of the felly 1 is the hub 3, which is provided with a plurality of radial recesses in which the flexible spokes 4 are received and securely held against movement in any direction. Each of the spokes 4 consists preferably of a plurality of flat springs 5 so that each spoke constitutes practically a radially disposed flat spring, which preferably is tapered toward its outer end. The width of the spokes 4 is preferably slightly less than that of the felly 1, but such width may be changed and varied at will without departing from the invention. The length of the spokes 4 is less than the least radial distance separating the hub from the felly. The number of said spokes 4 is equal to the number of U-shaped projections 2 of the felly and said spokes are positioned relatively to the felly so that the outer end of each spoke opposes a U-shaped projection 2, but is separated from the same by a free space.

Each of the spokes 4 is provided in its outer end with two openings through which bolts 6 are adapted to pass. Each of the U-shaped projections is provided in respectively opposite diverging walls with one opening for the passage of the shank of a bolt 6. Each of the latter is provided with a head 7 presenting a spherical surface opposing the wall of the projection 2 through the opening in which the shank thereof projects. The other end portion of each bolt 6 is threaded to receive a nut 8. Each of the nuts 8 is preferably provided with a projecting sleeve 9 having longitudinal slots 10 therein in which the ends of the locking pins 11 driven into an opening in the threaded end portion of the bolt 6 are adapted to pass. Each of the bolts 6 extends from one of the projections 2 to a point slightly beyond the next adjacent projection 2 and through one of the openings in a spoke 4. Each of the spokes 4 is thus secured to two of the U-shaped projections 2 disposed at either side of and next adjacent to the projection 2 opposing the end of the spoke.

The nuts 8 are adjusted so as to allow for longitudinal movement of the bolts 6 relatively to the spokes 4 and projections 2 with which they are engaged. Thus the pair of oppositely extending bolts 6 engaged with one of the spokes 4 are laterally offset and separated from each other by a space, the width of which will be changed and varied according to the width of the spokes 4. The openings in the latter are preferably of slightly greater diameter than the bolts 6 so that the latter have slight play therein.

The hub 3 is adapted to receive a plate 12 provided with a circumferential flange 13 which is adapted to engage in notches or recesses in the inner end portions of the spokes 4 and in a circumferential groove in the hub which intersects the recesses or pockets in which the inner end of the spokes 4 are received. The plate 12 is adapted to be secured to the hub 3 by means of the bolts 14 and may be readily removed when desired for purposes of removing and replacing spokes or parts thereof as will be obvious.

Referring now to Fig. 1 it will be apparent that when load is imposed upon the hub 3 the latter will tend to move downwardly against the supporting effect of the spokes 4 and bolts 6. This will cause those spokes 4 which are horizontally or substantially horizontally disposed, to be flexed longitudinally in the plane of the felly 1 and by reason of the fact that each of said spokes is now suspended from the bolts 6 which are hung from the projection 2 at a higher elevation than the said spokes, there will be a tendency to longitudinally distort said spokes 4, the extent of said distortion varying according to the position of the spoke. The downward movement of the hub will obviously effect similar movement of the vertically or substantially vertically disposed spokes 4, but, by reason of the suspension of said spokes from the laterally separated oppositely projecting bolts 6, any movement of said spokes will cause a vertical movement of the end portions of the bolts 6 engaged with said spokes. As said bolts are inflexible, a tension strain will be imposed upon the same, which will effect a distortion of the outer end portion of said vertically or substantially vertically disposed spokes 4 so that the latter add their flexible resistance of this nature to the relative movement of the hub and felly. Thus in a wheel constructed in accordance with my invention the strain due to load on the hub is distributed over all of the spokes simultaneously, with the result that some of said spokes are subjected to a compound flexing longitudinally and torsionally and others torsionally only. In this way, however, I am enabled to construct the wheel of lighter materials and the life of the flexible portions is increased in accordance with the lessening of the strains thereon due to localization of load. Any suitable rim or tire may be mounted upon and suitably secured to the felly 1 as will be obvious.

While I have illustrated the preferred embodiment of the invention in the accompanying drawings, it will be obvious that the same may be embodied in other specific constructions than that shown, without, however, departing from the invention as defined in the appended claims.

I claim as my invention:

1. In a vehicle wheel, a hub, radially disposed flat flexible spokes rigidly secured at one end thereto, a felly normally concentric with said hub, there being free spaces between the outer ends of the spokes and the felly, and tension members connecting the outer end of each spoke and points in the felly arcuately removed from opposite sides of the spoke the points of connection of said tension members with the spoke being laterally spaced apart in the direction of the axis of the wheel.

2. In a vehicle wheel, a hub, a felly, and flexible members interposed between said parts for permitting relative movement between the hub and the felly in the plane of the latter, means connecting said interposed members and said felly whereby a relative movement between the latter and said hub will flex the interposed members tortionally in the plane of said felly.

3. In a vehicle wheel, a hub provided with radially projecting flexible spokes, a felly spaced from the outer ends of said spokes, and means connecting each of said spokes with said felly at two equidistant arcuately removed points laterally spaced apart in the direction of the axis of rotation of the wheel.

4. In a vehicle wheel, a hub provided with radially projecting flexible spokes, a felly spaced from the outer ends of said spokes, and tension members connecting each of said spokes with said felly at two equidistant arcuately removed points laterally spaced apart in the direction of the axis of rotation of the wheel.

5. In a vehicle wheel, a hub provided with radially projecting flexible spokes, a felly spaced from the outer ends of said spokes, and tension members connecting each of said spokes with said felly at two equidistant arcuately removed points, said tension members connected with said spoke at laterally separated points for distorting said spokes upon relative movement between the hub and felly.

6. A vehicle wheel comprising a hub, a felly, interposed flexible spokes carried by the hub, and means effecting engagement between the spokes and said felly for flexing said spokes in the plane of the felly and tortionally as said hub moves relatively to said felly against the resistance offered by said spokes.

In testimony whereof I have signed my name in presence of two subscribing witnesses.

FERDINAND C. KUMMEROW.

Witnesses:
M. M. BOYLE,
I. CLUSPITZ.